(No Model.) 2 Sheets—Sheet 1.
W. L. B. COLLINS & L. L. BARRETT.
VALVE MOTION AND GOVERNOR FOR ENGINES.
No. 245,351. Patented Aug. 9, 1881.
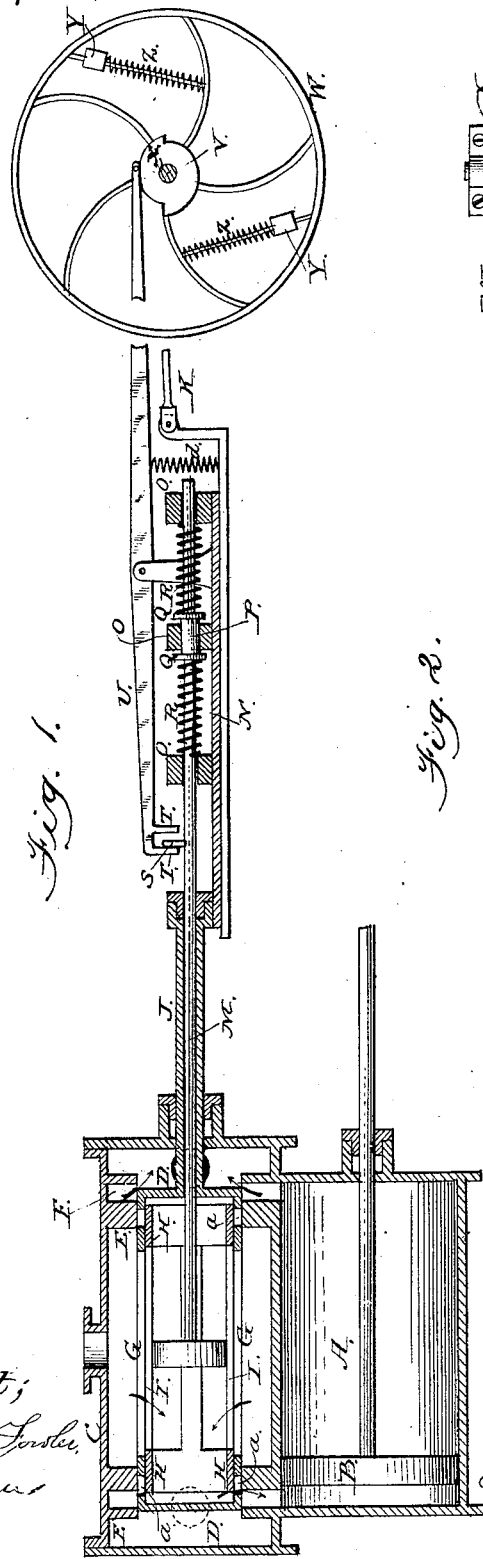
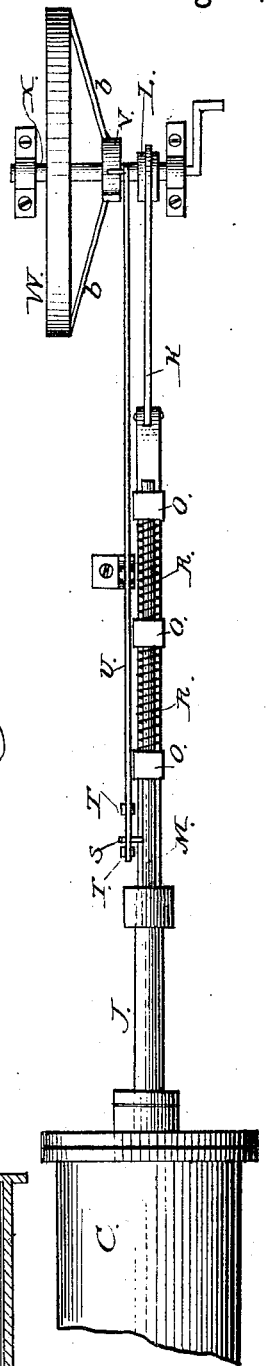
Fig. 1.
Fig. 2.
Attest:
J. Walter Fowler,
R. K. Evans
Inventors;
Wm L. B. Collins
Lemuel L. Barrett
by A. H. Evans & Co.
atty.

(No Model.) 2 Sheets—Sheet 2.
W. L. B. COLLINS & L. L. BARRETT.
VALVE MOTION AND GOVERNOR FOR ENGINES.

No. 245,351. Patented Aug. 9, 1881.

Witnesses
Geo. H. Strong.
Frank A. Brooks

Inventors
William L. B. Collins 3rd
Samuel L. Barrett
By Dewey & Co. Attys

UNITED STATES PATENT OFFICE.

WILLIAM L. B. COLLINS AND LEMUEL L. BARRETT, OF VACAVILLE, CAL.

VALVE-MOTION AND GOVERNOR FOR ENGINES.

SPECIFICATION forming part of Letters Patent No. 245,351, dated August 9, 1881.

Application filed April 4, 1881. (No model.)

*To all whom it may concern:*

Be it known that we, WILLIAM L. B. COLLINS and LEMUEL L. BARRETT, of Vacaville, county of Solano, State of California, have invented an Improved Valve-Motion and Governor for Engines; and we hereby declare the following to be a full, clear, and exact description thereof.

Our invention relates to certain improvements in valve-motions and governors for steam-engines; and it consists in the employment of a peculiar double balance-valve and cut-off, in combination with a governor which regulates the action of the cut-off valve, while the main valve is actuated directly from the engine-shaft. The cut-off valve is connected with the main valve by springs, so as to move with it when not acted upon by the governor. The governor moves a cam, and through a connecting-lever intercepts the cut-off-valve stem at the point where the main valve opens so as to admit steam to the cylinder during a part of the stroke of the piston, which will be determined by the action of the governor and cam. At the proper time the cut-off valve will be released, and the springs act to throw it forward and instantly close the port.

This apparatus and the details of construction will be more fully explained by referring to the accompanying drawings, in which—

Figure 3:
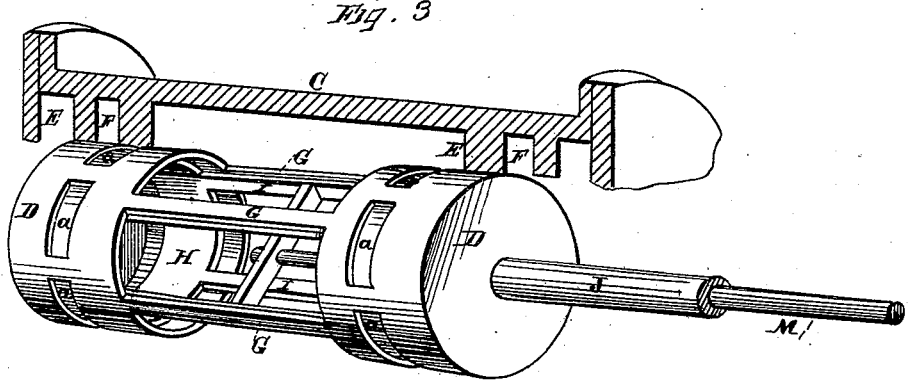
Figure 4:
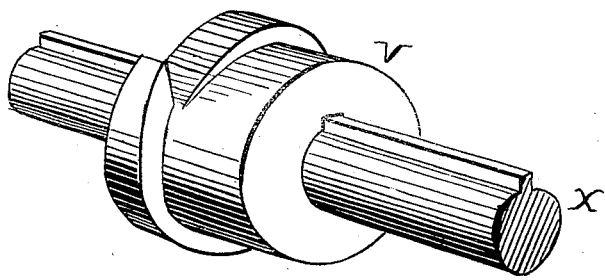

Figure 1 is a vertical sectional view of my apparatus, showing the valves and operating mechanism. Fig. 2 is a plan or top view. Fig. 3 is an enlarged view of the valves. Fig. 4 is an enlarged view of the cam.

A is the cylinder of an engine, with the piston B, piston-rod, and the usual connection with the crank upon the shaft.

C is the valve-chamber, and D is the main valve, which is made cylindrical at each end. These ends move within casings E, which are bored to fit them closely, and have annular chambers F, which open into the cylinder-ports to lead steam to the engine when the valve is opened to allow the steam to flow into the spaces F. Openings or ports *a* are made through the cylindrical shells forming the valves, and they extend around it, so that steam may flow freely out when they are opened. The cylindrical ends of the valve are united by longitudinal bars or ribs G, so as to leave large spaces between them for the ingress of steam from the steam-chest to the interior of the valve.

The cut-off valve H consists of two light cylindrical shells, which form its ends, and are united by ribs I, corresponding with the ribs G of the main valve. The cut-off valve fits the interior of the main valve, and is of such a length that its ends just cover and close the ports *a* when it is at rest in its central position. When these ports are to be opened this valve is moved back to expose them at whichever end they are to be opened. Both valves being hollow, steam freely enters the central portion from the surrounding steam-chest, but cannot pass beyond the casings E at the ends, nor escape through the ends of the main valve, which are closed. When the cut-off valve is drawn back to expose the ports *a* of the main valve at either end steam will flow outward into the chamber F, and from thence into the cylinder.

The mechanism for operating the valves is constructed as follows: The stem J, which connects with the main valve D, passes out through the steam-chest and is connected by an eccentric-rod, K, with the eccentric L upon the main shaft, receiving motion from it. This valve-stem is hollow, and the cut-off-valve stem M passes through it and through a frame or angular part, N, which lies between the stem J and the eccentric-rod K of the main valve. This part N has three projections, O, through which the stem M passes. This stem is enlarged or has a collar at P, where it passes through the central projection, O, and loose sleeves or washers Q abut against this enlargement. Spiral springs R surround the stem M between the outer projections, O, and the central one, and exert their pressure against the enlargement P, or against the washers Q, which rest against it, and thus tend to hold the stem in one place, which retains the cut-off valve at a point which will cause it to just cover the ports at each end of the main valve.

From this it will be seen that unless the cut-off valve is moved to one side or the other by some exterior force it will always travel with the main valve and always keep the ports closed. In order to move or rather hold this cut-off valve back at the proper time to allow steam to pass through the ports in the main valve and into the cylinder, the stem M has a projecting arm, S, which is alternately engaged by the arms T T on a lever, U, and the stem M, and with it the cut-off valve, is held back just as the ports of the main valve arrive at a point opposite the steam-passages F. By thus stopping the cut-off valve while the main valve continues its motion, the ports of the latter will be opened and steam admitted into the cylinder. At the point where steam is to be cut off the arm S is released, and the spring R upon that side forces the stem M and the cut-off valve forward, so as to close the steam-port and cut off further admission of steam to the cylinder. This action takes place alternately at each end of the cylinder. The point at which steam is cut off depends upon the governor and its action upon a cam, V, which actuates the lever U, so as to cause the arms T to engage with and disengage from the arm S.

The governor consists of a balance-wheel, W, keyed to the engine-shaft X, and having the weights Y fitted to slide out toward the periphery by the centrifugal action of the wheel, or in toward the center by the action of springs Z. Arms $b$ from the weights Y connect with a double-faced cam, V, which is fitted upon the shaft at one side of the wheel W, and so as to slide to or from it upon a feather. It will thus be seen that when the weights Y are thrown outward the arms $b$ will draw the double-faced cam toward the wheel, and when they move inward the cam will be forced away from the wheel. The portion of the cam nearest the wheel is circular, so that the end of the lever U may be allowed to rest upon it during the whole revolution when the engine moves slowly or when it is to take steam during the full stroke. This throws the opposite end of the lever down and causes the arms T to engage with the arms S and open the valve-ports by holding the cut-off valve back, so that steam will be admitted during the entire stroke. The other side of the cam is made of a smaller diameter, and the larger and smaller diameters are united by the angular cam-faces, which not only approach the smaller from the larger diameter, but also form an angle with the face, as shown in Fig. 4. When this double-faced cam is drawn toward the wheel by the expansion of the governor-weights the end of the lever U will be caused to fall from the larger to the smaller portion of the cam by the action of a spring, $d$; and the point at which it will fall will depend upon the distance which the cam has moved toward the wheel as the end of the lever drops from the inclined edge $e$, at whatever point this incline is brought beneath it. The lever is again raised and the arms or lugs T at the opposite end depressed, so as to engage the arm S by following up the horizontal incline from the smaller to the larger circle as the shaft and cam revolve. The point at which lever will be brought upon this larger portion of the cam will bring the arms T down to intercept the arm S just before the main valve has been moved by its eccentric far enough to bring its ports $a$ opposite the passages F.

In the present case the lever U is shown pivoted centrally, so that one end is caused to rise and fall by the action of the cam, and the other, with its tripping-arms, is correspondingly moved to operate the cut-off valve. It will be seen, however, that in place of a lever a rotating or oscillating arm might be used, which would be caused to turn partly around and back by the action of the cam, and pins or arms at its opposite end would operate upon the cut-off-valve stem in the same manner as here shown.

By this construction it will be seen that we have a cut-off the action of which is regulated very closely by a governor which is affected by slight changes in the speed of the engine-shaft. The cut-off valve, being open at each end and formed of two thin shells united by light ribs, will be extremely light and subject to no pressure of steam which will cause it to bend or work hard.

Having thus described our invention, what we claim as new, and desire to secure by Letters Patent, is—

1. The valve consisting of the hollow cylindrical ends D, united by the longitudinal ribs G, and having the ports $a$ to admit steam to the channels F, in combination with the hollow interior valve, H, extending beyond the ports $a$, substantially as and for the purpose herein described.

2. The valve D, with its hollow stem J, connected with the eccentric, and the valve H, with its stem M, passing through J and into the frame N, in combination with the springs R, acting against the collar P, substantially as and for the purpose herein described.

3. The concentric hollow valves D and H, moving within the steam-chest C, as shown, and having the stems J and M, with the uniting springs R, in combination with the arms S upon the stem M and the arms T upon the lever U, substantially as and for the purpose herein described.

4. The valves D H, with the stems J M, united by the springs R, and the lever U, with the arms T and spring $d$, in combination with the cam V, upon which the end of the lever rests, substantially as and for the purpose herein described.

5. The cam V, turning with the engine-shaft X and connected with or supporting the lever U, and the centrifugal governor Y Z, having the connecting rods or arms $b$, in combination with the rod M, having lug S, substantially as and for the purpose herein described.

6. The combined cut-off and governor for engines consisting of the concentric hollow valves D H, with their stems J M, uniting-springs R, tripping-arms S T, and the oscillating lever U, in combination with the sliding and rotating cam V and the governor Y Z connected therewith, substantially as and for the purpose herein described.

In witness whereof we have hereunto set our hands.

WILLIAM L. B. COLLINS.
LEMUEL L. BARRETT.

Witnesses as to signature of Barrett:
GEO. H. STRONG,
S. H. NOURSE.

Witnesses as to signature of Collins:
J. B. MERCHANT,
JOHN YOUNG.